June 5, 1951

N. O. PANZEGRAU ET AL 2,555,556

ADAPTER FRAME FOR CONVERSION OF TRUCK TO BUS CHASSIS

Filed April 27, 1948

Inventors:
Norman O. Panzegrau
Robert T. Hendrickson
Paul O. Pippel
Atty.

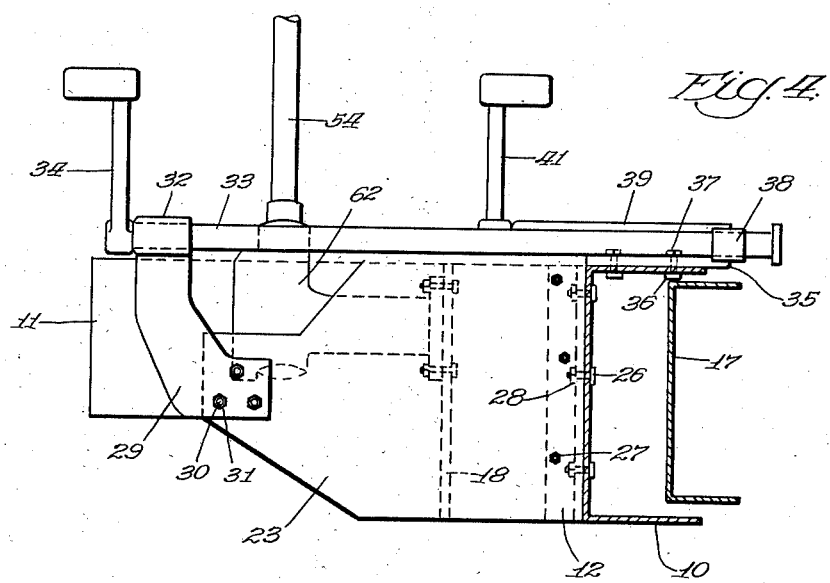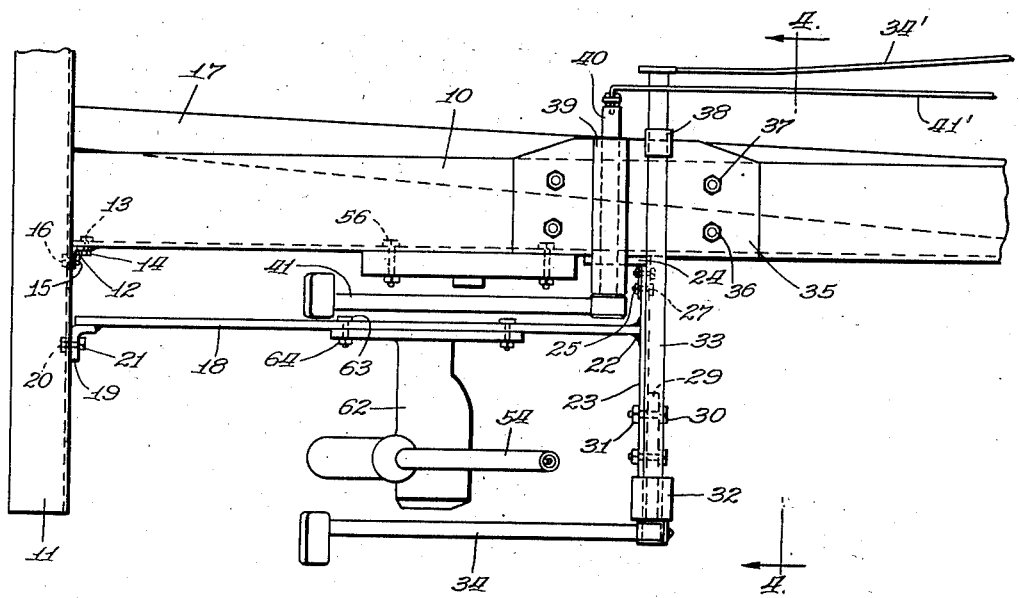

June 5, 1951

N. O. PANZEGRAU ET AL
ADAPTER FRAME FOR CONVERSION
OF TRUCK TO BUS CHASSIS 2,555,556

Filed April 27, 1948

Inventors:
Norman O. Panzegrau
Robert T. Hendrickson

Paul O. Pippel
Atty.

Patented June 5, 1951

2,555,556

UNITED STATES PATENT OFFICE 2,555,556

ADAPTER FRAME FOR CONVERSION OF TRUCK TO BUS CHASSIS

Norman O. Panzegrau, Chicago, and Robert T. Hendrickson, Hinsdale, Ill., assignors to International Harvester Company, a corporation of New Jersey Application April 27, 1948, Serial No. 23,578

3 Claims. (Cl. 180—1)

This invention relates to an automotive truck chassis or frame, but more particularly to a chassis frame of the character adapted for use in a passenger type automotive bus.

In the automotive industry it has been customary to build a frame chassis to meet the individual requirements of the vehicle, i. e. a bus or a truck, into which such frame was intended eventually to be installed. Because of this practice, a great many types and varieties of chassis frames have always been built, while the standardization thereof has been subordinated to other requirements of more paramount importance. This practice is, of course, costly and undesirable, particularly in vehicles manufactured for foreign markets where, for reasons of economy, greater flexibility is always desired in order to permit a more frequent and ready interchange of parts and assemblies between various types of vehicles, and thus permit the adaptation of a conventional chassis to many uses, such, for instance, as a passenger bus chassis. Heretofore, the transposition or conversion of assemblies and units in the field has not always been satisfactory because of the absence of special tools and other equipment required for such interchanges; since equipment of this character is usually found only in large factories or manufacturing plants. One of the most frequently encountered interchange or conversion operations is that which involes converting a standard or conventional automotive truck chassis into a chassis suitable for equipping with a conventional bus type body employed in passenger carrying vehicles wherein the operator and the control mechanisms he operates are usually positioned forward of the front wheel assembly, and, it is with conversion operations of this character in mind that the present invention is directed.

It is a principal object of this invention, therefore, to provide an adaptor frame which may be easily affixed to a conventional automotive truck chassis for conversion thereof to a chassis suitable for use in a passenger bus type vehicle.

Another important object of this invention is to provide a simple and inexpensive conversion adaptor frame having great strength and rigidity for converting an automotive truck chassis to a passenger type bus vehicle chassis without necessitating substantial structural changes therein.

Another important object of this invention is to provide a novel frame assembly suitable for rigid connection to an automotive truck chassis in order to facilitate the installation of a passenger bus type body thereon.

Another object is to provide an adaptor frame assembly designed with mounting means for the steering control mechanism, clutch and brake pedal assemblies, and front spring shackles, suitable for ready use in remounting such units when a conventional truck chassis is converted to receive a passenger bus type body.

A further object is to provide an adaptor frame assembly, suitable for installation without the use of special tools in the field, that may be readily installed on an automotive truck chassis in order to adapt such chassis to the installation of a Metropolitan type passenger bus body thereon.

Other objects and advantages will be understood and will become more apparent from the following description when read in conjunction with the drawings, in which:

Fig. 3 is a top plan view, in enlarged detail, of a portion of the adaptor frame of this invention and shows particularly the mounting means employed for attachment of the steering column mechanism, the brake and clutch pedal assemblies, and the forward front spring shackle, but omitting the toe-board and its associated enclosing structure.

Fig. 4 is a section taken on line 4—4 of Fig. 3.

Figures 1, 2:
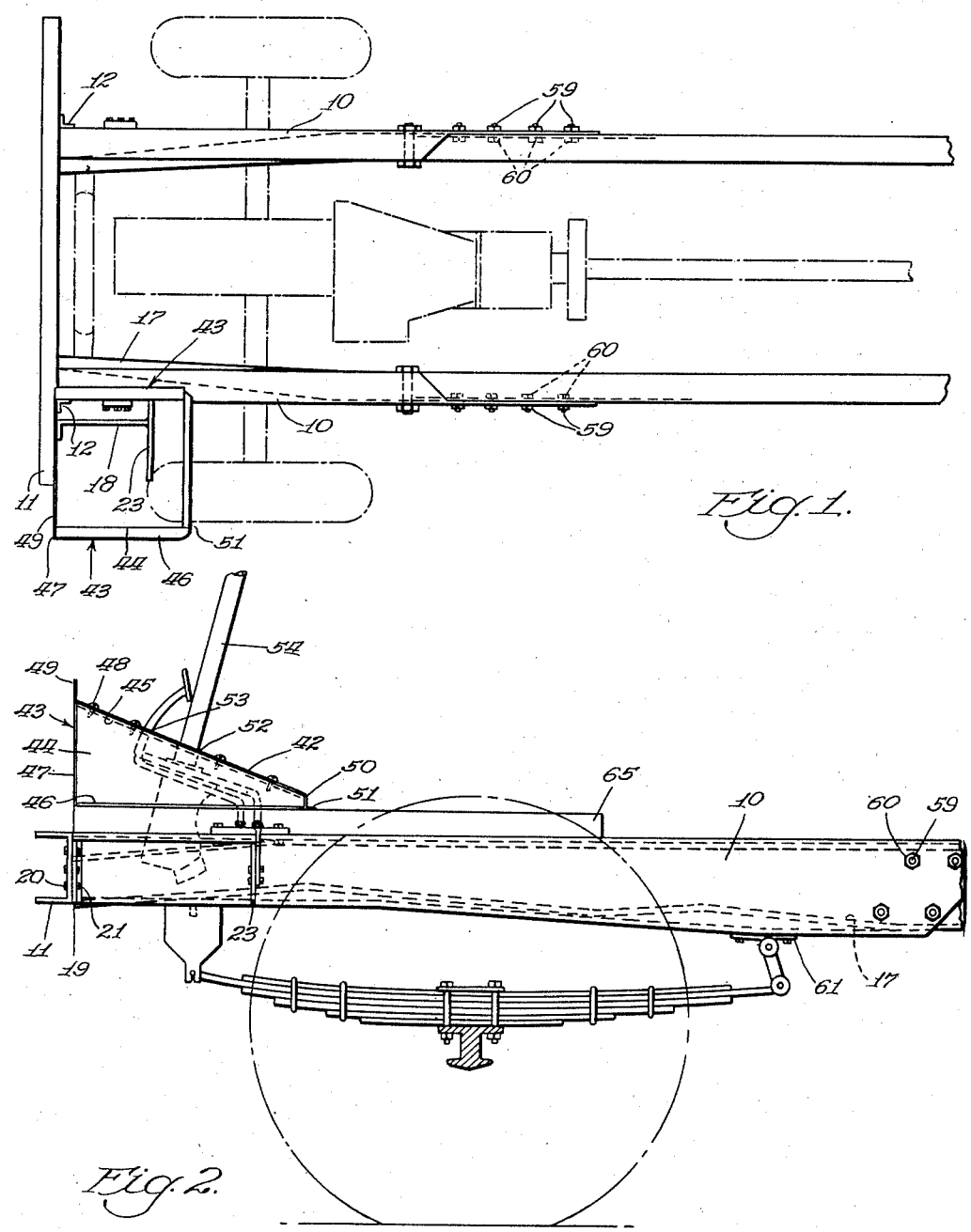
Fig. 1 is a top plan view of the front end of an automotive truck chassis (with radiator, power plant, wheels and axle shown in light lines) that has been converted, by application, thereto of the adaptor frame of this invention.
Fig. 2 is a side elevation of the front end of a chassis upon which the adaptor frame of the present invention has been installed. Many details of assemblies, such as radiator, engine, etc., not pertinent to the present invention have, of course, been omitted.

The present invention, reference now being had to the drawings, comprises a pair of parallel complementary channel members, indicated generally by the numeral 10, secured, in spaced relationship, at one end thereof to a cross-channel member 11. An angle bracket 12, affixed to one end of each channel member 10, by suitable securing means such as the bolt 13 and nut 14, and to the channel cross member 11 by the bolt 15 and nut 16, serves to maintain said opposed members 10 rigidly and in spaced relation. The spacing of these members is adapted to correspond substantially with the widest spacing at the forward end of the tapered, downwardly bent and inwardly flaring side channel members of the conventional vehicle chassis frame, indicated generally by the numeral 17. A laterally extending and vertically mounted bracket 18 is affixed at one end to the cross member 11 by suitable means, such as the angle 19 welded to one end of said bracket and secured to said cross member by a bolt 20 and nut 21, while the opposite end of said bracket is secured, preferably by welding along its vertical marginal edges, as indicated at 22, to a transverse bracket 23, in turn fixedly secured to the outer face of one of the channel members 10 by means of the angle 24, bolts 25 and 26, and nuts 27 and 28, respectively. An upwardly extending bracket 29 is affixed, by suitable means such as the bolt 30 and nut 31, to said transverse bracket 23, and is provided along its upper marginal edge with a sleeve-type bearing portion 32 adapted to rotatably support a shaft 33. On one end of said shaft is mounted a clutch pedal assembly 34, while the opposite end thereof is connected to a control linkage, indicated generally by the numeral 34'.

A bearing bracket plate 35, fixedly secured to the top face of one of the channel members 10 by a plurality of bolts 36 and nuts 37, has mounted on the top thereof a sleeve-type bearing 38 adapted to rotatably support the opposite end of shaft 33, and an additional elongated sleeve-type bearing 39 adapted to rotatably support a shaft 40. On one end of said latter shaft is mounted a brake pedal assembly 41, while the opposite end thereof is connected to a control linkage, indicated generally by the numeral 41'. The bracket plate 35 may be fashioned with the bearings 38 and 39 as an integral part thereof, or, the bearings may be separately fashioned and then secured to said plate by some suitable means such as welding or brazing.

Figure 5:
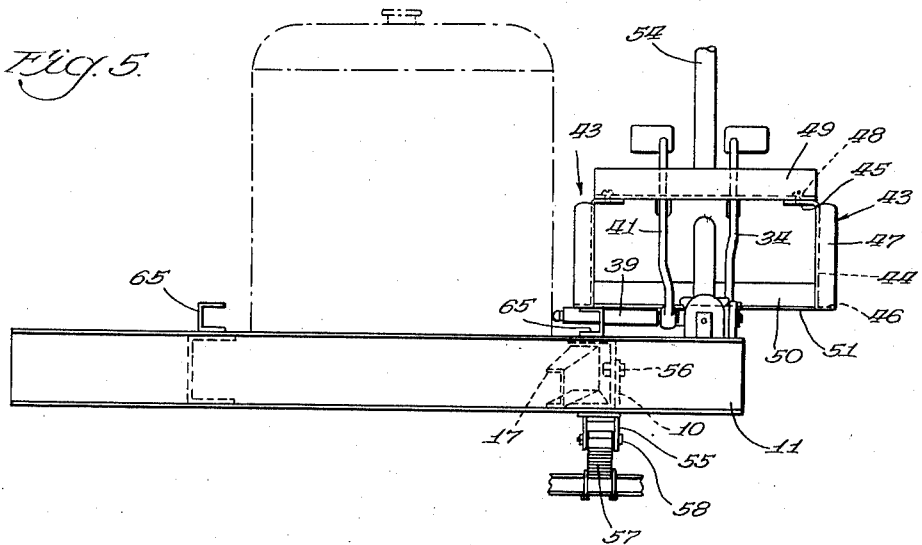
Fig. 5 is a front plan view of the adaptor frame of the present invention showing its relationship to certain units and assemblies as well as one side of the frame, found on the front end of a conventional automotive vehicle chassis.

A bonnet-like enclosure, shown only in Figs. 1, 2 and 5, may, if desired, be provided to support the toe-board 42. Such enclosure may consist of a pair of parallel complementary cover plate members, indicated generally by the numeral 43, oppositely disposed beneath the side marginal edges of the toe-board 42. Each such plate is fashioned with a main vertically extending panel portion 44, an inwardly turned flange portion 45 along its upper edge, and outwardly turned flange portions 46 and 47, respectively, along its lower and vertical marginal edges. The upper flange portion 45 is adapted to support the toe-board 42 which may be affixed thereto by suitable securing means such as the self-tapping screws 48. The vertical flange 47 is fashioned for affixment, in convenional manner, to the front vertical body panel (not shown), while the lower flange 46 is adapted for positioning on, and attachment by suitable means to, the vehicle floor board also a part of the body (not shown). An upper or front marginal edge of the toe-board 42 is provided with an upwardly turned flange portion 49 adapted for affixment in conventional manner to the front vertical body panel (not shown), while the lower or rear marginal edge thereof is fashioned with a downwardly turned portion 50 and an outwardly turned flange portion 51 which may be rigidly affixed by suitable securing means to the vehicle body floor (not shown) and thus fixedly secure said toe-board. It is understood, of course, that openings 52 and 53 may additionally be provided in the toe-board to accommodate a conventional steering column assembly 54, and the clutch and brake pedal members 34 and 41, respectively.

Figure 6:
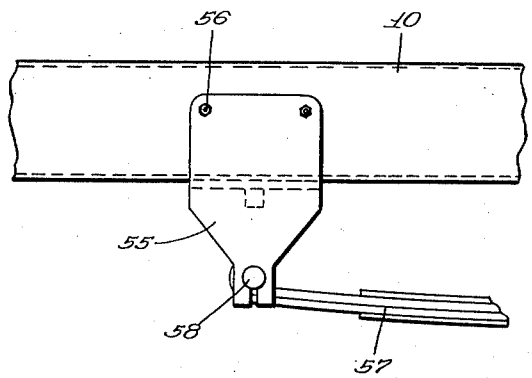
Fig. 6 is a side elevation, in enlarged detail, showing the adaptor bracket employed for remounting the forward shackle of the front spring of the vehicle.

In Figure 6 there is illustrated an enlarged detail of the forward shackle bracket 55 provided for the front spring. Said bracket, fashioned substantially as indicated, is secured to the outer vertical face of the channel member 10, by suitable bolt and nut means 56, and the front spring 57 supported therein in conventional manner on the shackle pin 58.

In adapting the present invention to a conventional automotive truck chassis frame, such as indicated at 17 (Figs. 1, 2 and 5), the front cross member, bumper structure, and front spring shackle brackets (none of which are shown in the drawings) are first removed from said frame by any suitable means usually available in the field, after which the parallel side channel members 10 of the adaptor frame are telescoped over the front end of the tapered downwardly bent and inwardly flaring side channels of said frame 17 (as shown in Figs. 1, 2 and 5) and securely affixed thereto by conventional means such as a plurality of bolts 59 and nuts 60. If preferred, however, rivets may be substituted for the bolting means without departing from the spirit of the invention. Since the front end of the side channels of a conventional truck frame usually bend downwardly and taper inwardly toward one another, as well as in their vertical dimension, it is desirable that the adaptor frame be sufficiently long to permit attachment thereof to said conventional frame members at a point where the side members of said conventional frame are substantially parallel and are of such vertical dimension that they fit snugly inside the telescoped adaptor members. As thus converted the front end of the chassis frame becomes highly stable and very rigid without sacrificing any of its flexibility. Next the forward shackle bracket 55 is affixed, as previously described, while the rear shackle bracket 61 (previously removed from the channel members 17) is remounted in conventional manner to the underneath side of said channel member 10. Although only one front spring has been illustrated, it will be understood, that two such springs, and their associated shackle brackets are employed, and that one such structure is affixed to one of the side channel members 10, while the other spring structure is attached to its complementary side frame channel member.

The bracket assemblies 18, 23 and 35 may be affixed to the adaptor frame before said adaptor is telescoped over the chassis frame 17, or later, in accordance with the requirements of local field conditions.

Since a conversion of the nature contemplated by the present invention necessitates relocating the steering column and clutch and brake pedal assemblies, all of which are moved forward from their conventional positions, it will be appreciated that suitable provision has been made for repositioning these units. The steering column gear case housing 62 is remounted on the bracket 13 and may be readily secured thereto by a plurality of bolts 63 and nuts 64, while the clutch pedal assembly 34 is mounted in bearings 32 and 33 and the brake pedal assembly 41 is mounted in the bearing 39. Because of the relocation of these units it also becomes necessary to provide a longer drag-link for connecting the steering column arm with the steering knuckle (none of which are shown), as well as longer extension rods for the control linkage 34' and 41' for the clutch and brake assemblies, respectively. Such extension members may, however, be provided as accessories and supplied with the adaptor frame, thus greatly facilitating the adaptation and conversion of the truck chassis frame in the field.

Spacer channel members 65, affixed in conventional manner to the top face of the channel members 10, are provided to permit use of the conventional hood (not shown) without adding a panel member thereto to fill the opening between its lower edge and that of the side frame channel members.

It should now be apparent that a novel and improved form of adaptor frame has been shown and described, and, although a preferred form thereof has been illustrated and described in detail, it should be understood to those skilled in the art that various modifications may be made therein without departing from the spirit of the invention or from the scope of the appended claims.

What is claimed is:

1. In automobile truck construction having, a main chassis frame with side frame members, a steering column unit, and clutch and brake pedal assemblies, in combination; an adaptor frame embodying spaced side frame members adapted for telescoping over the front end of the corresponding members of said main chassis frame and projecting a considerable distance in alignment with and alongside of the latter side frame members; means for securing said adaptor frame members to corresponding side frame members of said main chassis frame; a cross member fixedly secured to one end of each of said adaptor side frame members; bracket means secured to said cross member and to one of said adaptor side frame members and adapted for supporting said steering column unit and clutch and brake pedal assemblies thereon; said bracket means including a longitudinally extending and vertically positioned member secured at one end to said adaptor frame cross member, and a transversely extending vertically positioned member secured at one end to one of said adaptor side frame members and additionally secured at a position spaced from the ends thereof to the opposite end of said longitudinal member, and a plate-like bearing member fixedly secured to the upper face of one of said adaptor side frame members; said transverse member having positioned along the top marginal edge thereof a bearing unit for rotatably supporting one end of a clutch pedal assembly positioned therein.

2. In automobile truck construction having, a main chassis frame with side frame members, a steering column unit, and clutch and brake pedal assemblies, in combination; an adaptor frame embodying spaced side frame members adapted for telescoping over the front end of the corresponding members of said main chassis frame and projecting a considerable distance in alignment with and alongside of the latter side frame members; means for securing said adaptor frame members to corresponding side frame members of said main chassis frame; a cross member fixedly secured to one end of each of said adaptor side frame members; bracket means secured to said frame cross member and to one of said adaptor side frame members and adapted for supporting said steering column unit and clutch and brake pedal assemblies thereon; said bracket means including a longitudinally extending and vertically positioned member secured at one end to said frame cross member, and a transversely extending vertically positioned member secured at one end to one of said adaptor side frame members and additionally secured at a position spaced from the ends thereof to the opposite end of said longitudinal member; and a bonnet-like enclosure adapted for positioning around said steering column unit and clutch and brake pedal assemblies; said enclosure bonnet comprising oppositely disposed and tapered panel members fashioned with inwardly turned flanges along their top marginal edge, a toe-board, and means for affixing said toe-board to said inwardly turned flanges; and means for detachably securing said bonnet-like enclosure to the adaptor frame members so that said enclosure will surmount said bracket means.

3. In automobile truck construction having, a main chassis frame with side frame members, a steering column unit, and clutch and brake pedal assemblies, in combination; an adaptor frame embodying spaced side frame members adapted for telescoping over the front end of the corresponding members of said main chassis frame and projecting a considerable distance in alignment with and alongside of the latter side frame members; means for securing said adaptor frame members to corresponding side frame members of said main chasis frame; a cross member fixedly secured to one end of each of said adaptor side frame members; bracket means secured to said frame cross member and to one of said adaptor side frame members and adapted for supporting said steering column unit and clutch and brake pedal assemblies thereon; said bracket means including a longitudinally extending and vertically positioned member secured at one end to said frame cross member, a transversely extending vertically positioned member secured at one end to one of said adaptor side frame members and additionally secured at a position spaced from the ends thereof to the opposite end of said longitudinal member, and a plate-like bearing member fixedly secured to the upper face of said adaptor frame member; said transverse member having positioned along the top marginal edge thereof a bearing unit for rotatably supporting one end of a clutch pedal assembly positioned therein; and a bonnet-like enclosure adapted for positioning around said steering column unit and clutch and brake pedal assemblies; said enclosure bonnet comprising, oppositely disposed and tapered panel members fashioned with inwardly turned flanges along their top marginal edge, a toe-board, and means for affixing said toe-board to said inwardly turned flanges; and means for detachably securing said bonnet-like enclosure to the adaptor frame members so that said enclosure will surmount said bracket means.

NORMAN O. PANZEGRAU.
ROBERT T. HENDRICKSON.

REFERENCES CITED

The following references are of record in the file of this patent:

UNITED STATES PATENTS

| Number | Name | Date |
|---|---|---|
| 1,020,376 | Symmonds, Jr. | Mar. 12, 1912 |
| 1,117,393 | Johnston et al. | Nov. 17, 1914 |
| 1,392,395 | Bruah | Oct. 4, 1921 |
| 1,596,001 | Cummings | Aug. 17, 1926 |
| 1,761,334 | Fry | June 3, 1930 |
| 1,926,928 | Yost et al. | Sept. 12, 1933 |

FOREIGN PATENTS

| Number | Country | Date |
|---|---|---|
| 619,898 | France | Jan. 11, 1927 |
| 270,397 | Great Britain | May 5, 1927 |
| 12,871 of 1933 | Australia | May 30, 1933 |
| 446,456 | Great Britain | Apr. 30, 1936 |